July 13, 1926.

T. SHIPLEY

ICE CAN

Filed May 17, 1924

1,592,050

Inventor;
Thomas Shipley,

By Dodge and Sons,

Attorneys

Patented July 13, 1926.

1,592,050

UNITED STATES PATENT OFFICE.

THOMAS SHIPLEY, OF YORK, PENNSYLVANIA.

ICE CAN.

Application filed May 17, 1924. Serial No. 714,153.

This invention relates to can ice systems and particularly to air connections for multiple can units intended for use in raw water plants, and provided with a manifold which feeds air through branch pipes to the various cans.

The important objects of the invention are to house the air pipes and fittings in the spaces between adjacent cans, where they are protected against mechanical injury, to provide a structure in which the air pipes can be readily disconnected while the cans remain in the supporting frame; to provide for differential expansion of the cans and air pipes, since these are usually made of different metals; and to allow for variations such as are caused by slight inaccuracies in the dimensions of the sheet metal cans.

A preferred embodiment of the invention is illustrated in the accompanying drawing, in which:—

Figure 2:
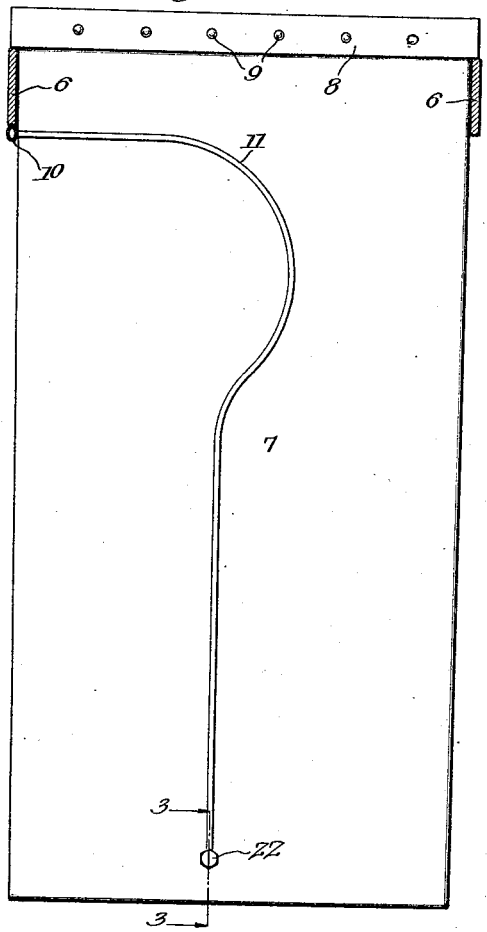
Fig. 2 is a section on the line 2—2 of Fig. 1.
Figure 1:
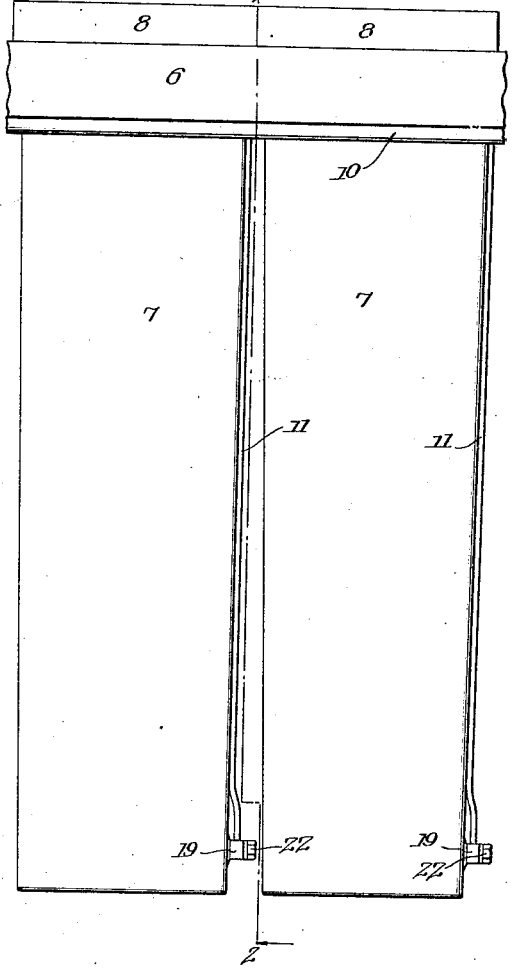
Fig. 1 is a side elevation of a portion of a multiple can unit showing two cans and a portion of the framework.
Figure 3:
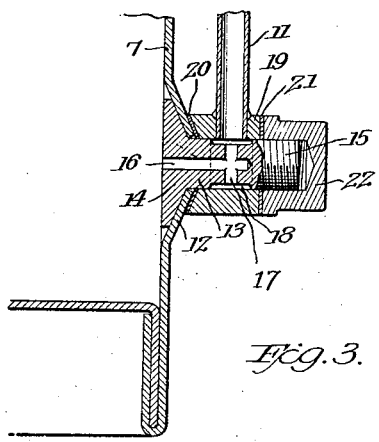
Fig. 3 is a section on the line 3—3 of Fig. 2.

The side members of the supporting frame of the can unit are indicated at 6, the cans at 7, and the reinforcing bands of the cans at 8. The reinforcing bands of adjacent cans commonly would be connected together by rivets 9 (Fig. 2), but any suitable construction may be adopted for the can unit proper, as that is a detail with which the present invention is not concerned. There are various multiple can units known to those skilled in the art and they are all characterized by the fact that between adjacent cans there is a narrow interval for the passage of brine. This interval is commonly wider at the bottom of the cans than at the tops because the cans are given a draft or taper to free the cakes.

Running beneath one of the side members 6 is an air tube 10 which, in the example illustrated, is shown as of oval cross section. This section is chosen in this instance to reduce the horizontal dimension of the pipe so that it will not exceed the thickness of the side member 6 and so it may yet have the necessary cross-sectional area.

Extending horizontally from the manifold pipe 10 at each inter-can space is a branch pipe 11 which is bowed into a reverse curve and thence extends downward to a point near the bottom of the cans.

Each can is provided on its side near the bottom, with a small orifice which is centered in a conical outward projecting boss 12 pressed in the sheet metal of the can. A stud 13, having a conical head 14 and a threaded outer end 15, is mounted with its head in the conical boss 12 and its threaded end projecting through the hole in the can wall. The stud 13 is provided with an axial port 16 which leads by radial ports 17 to a surrounding annular groove 18 cut on the outer surface of the stud 13.

The pipe 11 has its lower ends soldered into a ring-like sleeve 19 which fits snugly over the stem of the stud 13 so as to bring the bore of the tube 11 into communication with the groove 18. A gasket 20 is interposed between the sleeve 19 and the wall of the can 7, and a similar gasket 21 is interposed between the sleeve 19 and a cap nut 22 screwed onto the threaded end 15 of the stud 13.

This produces a construction which meets the peculiar requirements of multiple can units. The head 14 of the stud is flush with the interior of the can wall. A direct communication is afforded from the bore of the pipe 11, by way of groove 18 and ports 17 and 16, to the interior of the can. The sleeve 19 may swivel on the stud 13 and thus allow the lower end of the pipe 11 to assume any desired angular position about the axis of the stud; that is to say, about an axis normal to the plane of the can side. This feature is important because it avoids any stressing of the pipe 11 in the assembling of the device, while the bowing of the pipe avoids any stress due to differential thermo-expansion.

In the event that any repairs to the fitting are necessary, it is possible to reach into the space between the cans with a wrench, and remove the nut 22. The stud 13 is then pushed into the can, thus freeing the sleeve 19 and pipe 11. These may then be drawn out for inspection or repair without disconnecting the pipe 11 from the manifold 10, and thereafter the parts may be replaced in the reverse order. This not only facilitates repairs, but it is of the greatest convenience in assembling, as the air connections can be applied after the can and frame have been permanently connected. Where parts of the air piping must be installed before the cans are assembled, there is always danger of injury to the piping.

The curving or bowing of the branch pipes is an important factor in giving them the desired flexibility. The curvature is subject to wide variation and the word "curved" is used in the claims as a generic term to describe this feature.

The special fitting described is peculiarly useful when applied to can units in which the air is introduced through the side walls of the cans, because it can be assembled and dismounted in the narrow space between cans. It is not, however, limited in its utility to this location, since the flush interior surface which it affords, and the possibility of varying the angular position of the air pipe are desirable features regardless of location; while the ease of assembling is of practical importance in any case where the air pipe requires occasional disconnection.

What is claimed is:—

1. The combination with a multiple can unit including a frame and a plurality of ice cans fixed therein, of an air manifold carried by said unit, and a plurality of curved air pipes branching from said manifold, housed in the spaces between cans, free to expand and contract independently of the cans, and each connected to deliver air to the interior of a corresponding can through a wall thereof.

2. The combination with a multiple can unit including a frame and a plurality of ice cans fixed therein, of an air manifold carried by said unit; a plurality of curved air pipes branching from said manifold and housed in the spaces between said cans; and fittings serving to connect said air pipes to the interiors of corresponding cans through a wall thereof, said fittings being constructed and arranged to permit said pipes to assume various angular positions about an axis normal to such wall.

3. The combination with a multiple can unit including a frame and a plurality of ice cans fixed therein, of an air manifold carried by said unit; a plurality of curved air pipes branching from said manifold and housed in the spaces between said cans; and fittings serving to connect respective air pipes to the interiors of corresponding cans, said fittings each including a ported headed stud extending through the can wall from the inside, a sleeve connected to the corresponding branch pipe and angularly adjustable on the stud, and a cap nut threaded on the stud and confining and sealing the sleeve.

4. The combination with a multiple can unit including a frame and a plurality of ice cans fixed therein, of an air manifold carried by said unit; a plurality of curved air pipes branching from said manifold and housed in the spaces between said cans; and fittings serving to connect respective air pipes to the interiors of corresponding cans, said fittings each including two members threaded together one of said members being ported and extending through the can wall, and a sleeve clamped, together with the can wall, between said threaded members, and itself connected with the corresponding branch pipe.

5. The combination with an ice can having an opening in a wall thereof; of an air connection comprising a headed, threaded stud extending through said opening; a sleeve surrounding said stud and having an air tube connection, said stud and sleeve being formed to produce a port which communicates with said air tube connection, and extends through the stud to the interior of the can; a clamping nut threaded on said stud; and gaskets serving to seal the joints at the ends of said sleeve.

6. The combination of an ice can having an opening in a wall thereof surrounded by a recess on the inner side of the can wall; a threaded stud extending through said opening and having a head seated in said recess substantially flush with the inner face of the can wall; a sleeve surrounding said stud outside said can wall and having an air tube connection, said stud and sleeve being formed to produce a port which encircles said stud within said sleeve, communicates with said air tube connection, and extends through the stud to the interior of the can; gaskets at opposite ends of said sleeve; and a nut threaded on the end of said stud.

In testimony whereof I have signed my name to this specification.

THOMAS SHIPLEY.